US012519225B2

United States Patent
(12) United States Patent
Londono

(10) Patent No.: US 12,519,225 B2
(45) Date of Patent: Jan. 6, 2026

(54) EXPANDABLE PHASE ARRAY ANTENNA

(71) Applicant: Hughes Network Systems, LLC, Germantown, MD (US)

(72) Inventor: Jaime Londono, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 209 days.

(21) Appl. No.: 18/462,697

(22) Filed: Sep. 7, 2023

(65) Prior Publication Data

US 2025/0087881 A1 Mar. 13, 2025

(51) Int. Cl.

*H01Q 3/34* (2006.01)
*H01Q 1/08* (2006.01)
*H01Q 1/28* (2006.01)
*H01Q 3/28* (2006.01)

(52) U.S. Cl.

CPC ................. *H01Q 3/34* (2013.01); *H01Q 1/08* (2013.01); *H01Q 1/288* (2013.01); *H01Q 3/28* (2013.01)

(58) Field of Classification Search

CPC .......... H01Q 1/08; H01Q 1/10; H01Q 1/1235; H01Q 1/228; H01Q 3/28; H01Q 3/34; H01Q 21/061; H01Q 21/062; H01Q 21/065

See application file for complete search history.

(56) References Cited

U.S. PATENT DOCUMENTS

| | | | | |
|---|---|---|---|---|
| 4,524,552 A | 6/1985 | Hujsak | | |
| 6,850,204 B1 * | 2/2005 | Angelucci | ............ | H01Q 13/085 343/770 |
| 2014/0059840 A1 * | 3/2014 | Thompson, Jr. | ......... | H01Q 1/12 211/26 |

FOREIGN PATENT DOCUMENTS

| | | |
|---|---|---|
| CN | 116487864 A | 7/2023 |
| EP | 2351148 B1 | 11/2013 |
| GB | 2120857 A | 12/1983 |

* cited by examiner

*Primary Examiner* — Daniel Munoz

(74) *Attorney, Agent, or Firm* — Kilpatrick Townsend & Stockton LLP

(57) ABSTRACT

An expandable phased-array antenna assembly is described herein for mounting on a communication satellite. Embodiments include an expander carriage configured electromechanically to transition between a retracted configuration (e.g., during launch and initial deployment) and an expanded configuration (e.g., during operational ground communications) along an expansion direction. Embodiments include zigzag-shaped struts coupled with the expander carriage and having phased-array radiating elements (REs) mounted thereon. The expander carriage operate so that the struts are spaced at a smaller inter-strut spacing in the retracted configuration and at a larger inter-strut spacing in the expanded configuration. The struts and REs are arranged so that, in the expanded configuration, the REs form an operational phased-array lattice pattern. In some embodiments, the physical area of the phased-array antenna is at least forty percent smaller in the retracted configuration than in the expanded configuration.

20 Claims, 8 Drawing Sheets

EXPANDABLE PHASE ARRAY ANTENNA

BACKGROUND

Communication satellites communicate with ground equipment by transmitting and receiving wireless radiofrequency signals using one or more on-board antennas. Some communication satellites use phased-array antennas for such radiofrequency communications. Phased-array antennas typically consist of an array of radiating elements, such as patch or dipole antennas. Unlike conventional (e.g., parabolic) types of antennas that tend to use mechanical pointing and steering, phased-array antennas can implement electronic beam steering by precisely and dynamically controlling the phases and amplitudes of signals communicated by the radiating elements in the antenna array. In particular, concurrently radiating signals at carefully controlled relative phases and amplitudes produces a desired pattern of constructive and destructive interferences, which manifests as a focused beam in a desired direction. Techniques, such as digital beamforming, can be used to implement the dynamic phase and amplitude control across the antenna array.

Generally, a larger phased-array antenna will tend to provide better performance. One reason is that a larger phased-array antenna can support a larger aperture size (i.e., a larger area from which to radiate electromagnetic energy), which can provide higher gain. Another reason is that a larger phased-array antenna can support a narrower beamwidth to support increased signal strength and improved directivity. Another reason is that a larger phased-array antenna can support a larger number of radiating elements, which can support finer resolution control over beamforming for improved spatial resolution and tracking. Another reason is that a larger phased-array antenna can tend to support higher power levels without distortion, which can provide improved signal integrity. These reasons can generally yield better radiofrequency link quality over the large distances needed for satellite communications.

When a phased-array antenna is mounted on a satellite, the phased-array antenna must fit within design constraints of the satellite environment. These constraints can impose limits on the phased-array antenna's weight, physical dimensions, etc. For example, the physical dimensions of the satellite may be constrained by the dimensions of the satellite launcher (e.g., the bay size of a satellite launch vehicle) and by mounting real estate available on the satellite body structure (e.g., the dimensions of the Earth deck of the satellite). Thus, although a larger phased-array antenna tends to provide better performance, the dimensions of the phased-array antenna are conventionally limited by physical constraints imposed by the satellite deployment environment.

SUMMARY

An expandable phased-array antenna assembly is described herein for mounting on a communication satellite. Embodiments include an expander carriage configured electromechanically to transition between a retracted configuration (e.g., during launch and initial deployment) and an expanded configuration (e.g., during operational ground communications) along an expansion direction. Embodiments include zigzag-shaped struts coupled with the expander carriage and having phased-array radiating elements (REs) mounted thereon. The expander carriage operate so that the struts are spaced at a smaller inter-strut spacing in the retracted configuration and at a larger inter-strut spacing in the expanded configuration. The struts and REs are arranged so that, in the expanded configuration, the REs form an operational phased-array lattice pattern. In some embodiments, the physical area of the phased-array antenna is at least forty percent smaller in the retracted configuration than in the expanded configuration.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Communication satellites on-board antennas, such as phased-array antennas, to communicate radiofrequency signals. Phased-array antennas consist of an array of radiating elements, such as patch or dipole antennas. The array is typically arranged as a planar lattice. Electronic beam steering is implemented by using digital beamforming, or other techniques, to precisely and dynamically control the phases and amplitudes of signals communicated by the radiating elements, thereby producing controlled interference patterns that manifest as one or more focused beams in one or more desired directions. Generally, a larger phased-array antenna will tend to provide better performance. However, the physical dimensions of the phased-array antenna are limited by design constraints of the satellite environment in which it is deployed.

A novel expandable phased-array antenna assembly is described herein for mounting on a communication satellite.

Embodiments are configured to transition between a retracted configuration and an expanded configuration along at least an expansion direction. For example, the retracted configuration can be used to ensure that the phased array antenna fits within strict dimensional constraints imposed during satellite launch and initial deployment, and the expanded configuration can be used to maximize the phased array antenna area during operational ground communications for enhanced performance.

As described herein, expandable phased-array antenna assemblies are described for coupling with a communication satellite. In some embodiments, the communication satellite is a low-Earth orbit (LEO) satellite. In other embodiments, the communication satellite can be a medium-Earth orbit (MEO), geosynchronous orbit (GEO), or any other suitable type of communication satellite. In some embodiments, the expandable phased-array antenna panel is configured to communicate in the so-called "S-band," which is generally in the 2-4 Gigahertz radiofrequency spectrum band. In other embodiments, the expandable phased-array antenna panel is configured to communicate in the so-called "Ku-band" (12-18 Gigahertz), "K-band" (18-26 Gigahertz), "Ka-band" (26-40 Gigahertz), or any other suitable satellite radiofrequency spectrum band.

Figure 1A:
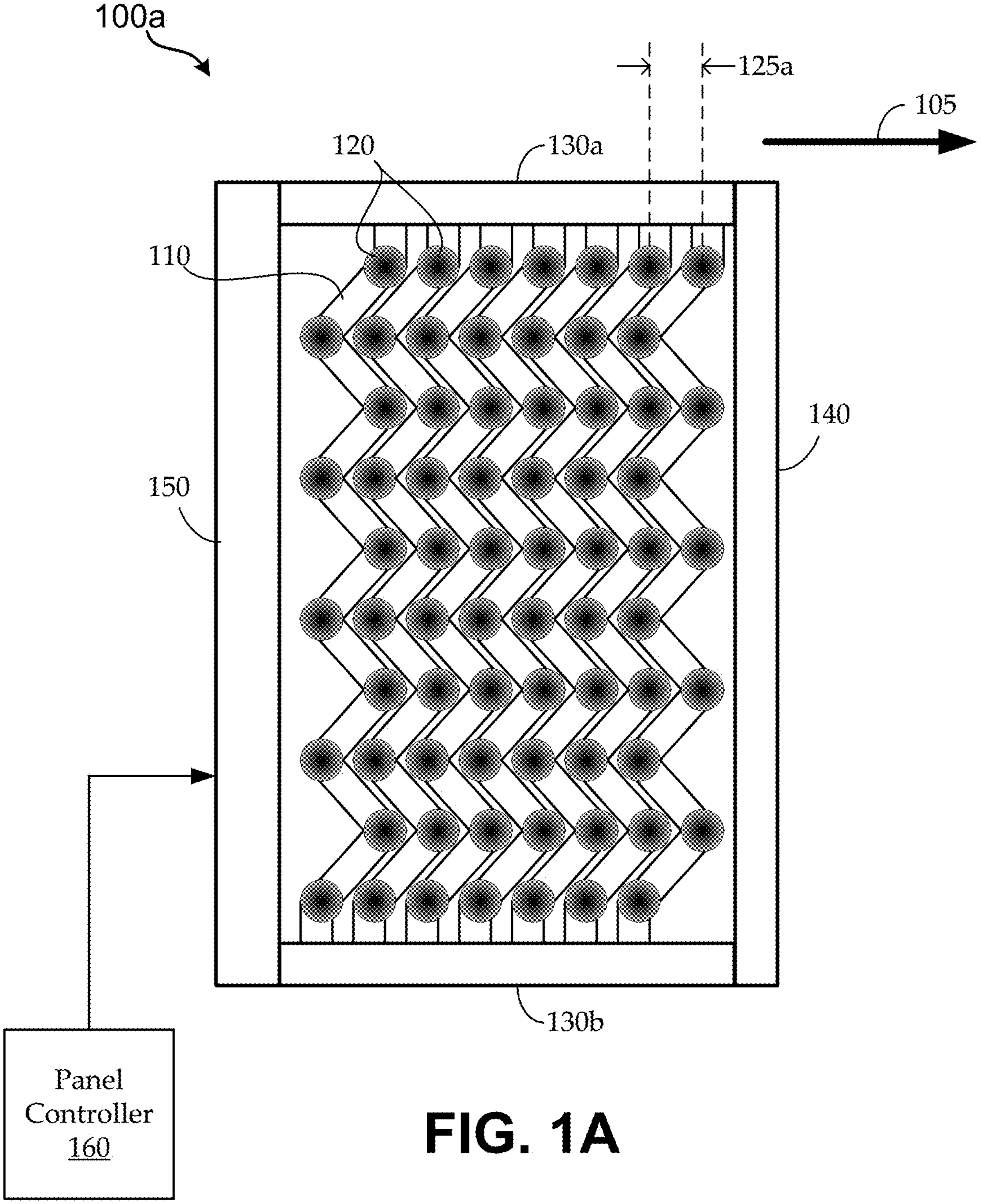
FIGS. 1A and 1B show an illustrative implementation of an expandable phased-array antenna assembly in a retracted configuration and in an expanded configuration, respectively.
Figure 1B:
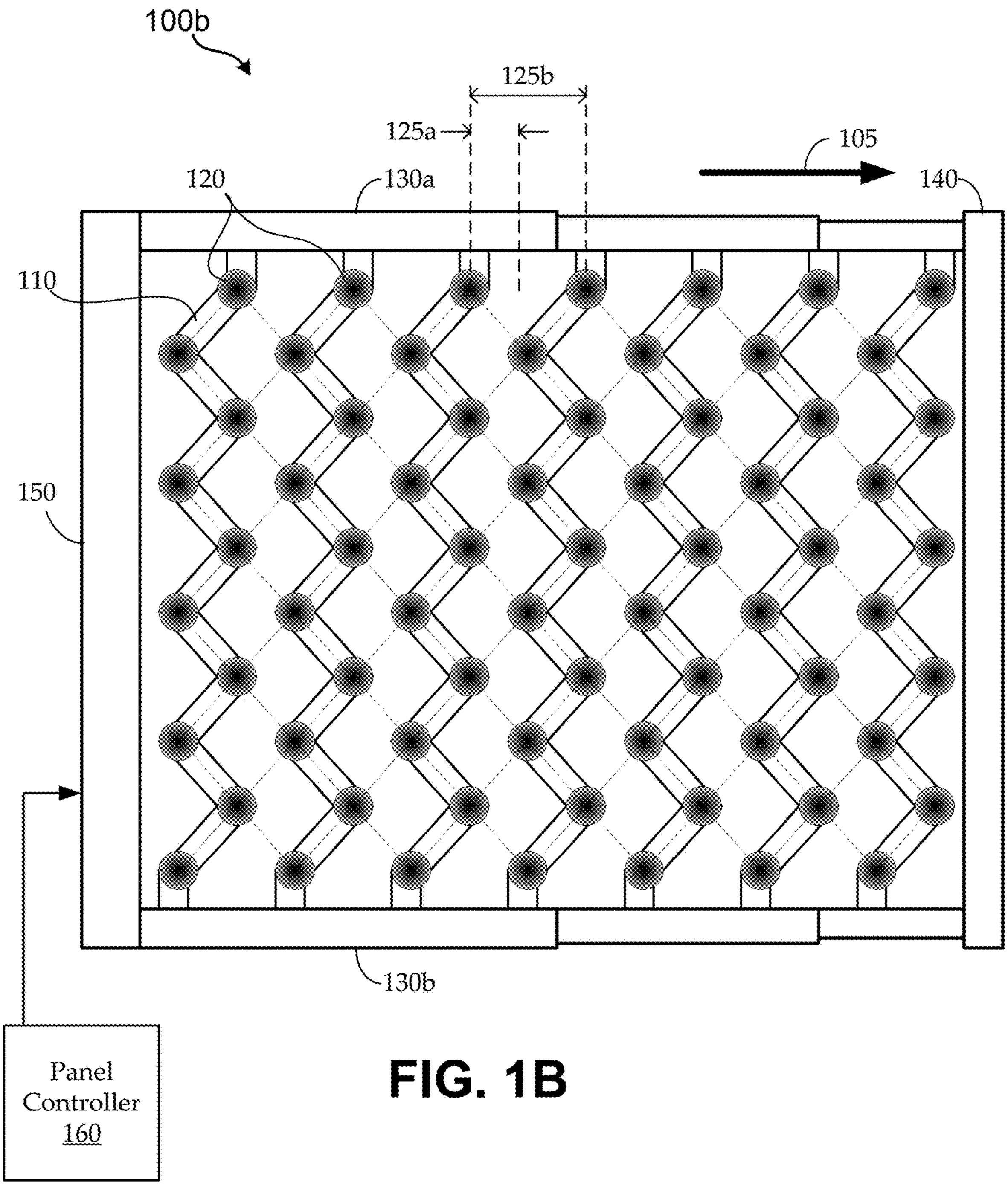

FIGS. 1A and 1B show an illustrative implementation of an expandable phased-array antenna assembly 100 in a retracted configuration and in an expanded configuration, respectively. The antenna assembly 100 includes an expander carriage that structurally supports a number of struts 110 and electromechanically transitions between the retracted and expanded configurations. Each of the struts 110 has a number of radiating elements (REs) 120 disposed thereon. In the retracted configuration (FIG. 1A), the expander carriage supports the struts 110 in a first (retracted) inter-strut spacing 125*a*. In the expanded configuration (FIG. 1), the expander carriage supports the struts 110 in a second (expanded) inter-strut spacing 125*b*.

The REs 120 and the struts 110 are arranged so that, when the expander carriage is in the expanded configuration, the REs 120 form a phased-array lattice pattern. In the implementation illustrated in FIG. 1B, the phased-array lattice pattern is a tiled lattice pattern of regular diamonds. Other implementations can be configured to form different phased-array lattice patterns in the expanded configuration, such as a rectangular lattice pattern.

In the illustrated embodiment, the struts 110 are zigzag-shaped. For example, each strut 110 is shaped according to a two-dimensional skew polygon with vertices alternating between two sets of parallel lines. As illustrated, each strut 110 can be aligned substantially with a direction orthogonal to the expansion direction 105. For example, the zigzag pattern of each strut 110 extends along a central axis of the strut 110, and the central axes of the struts 110 are substantially parallel to each other. In some embodiments, as illustrated, each RE 120 is disposed at one of the vertices of one of the struts 110. As illustrated in FIG. 1A, the zigzag shape is configured so that the struts 110 nest together in the retracted configuration. In some embodiments, such nesting provides over forty percent reduction in antenna area from the expanded configuration to the retracted configuration.

The expander carriage can be implemented in any suitable manner that supports electromechanical carriage of the struts 110 at and between the first and second inter-strut spacings 125. In the illustrated antenna assembly 100 of FIGS. 1A and 1, the expander carriage includes at least a first side frame structure 130*a* and a second side frame structure 130*b*. In some embodiments, each of the side frame structures 130 is a telescoping rail structure that lengthens in an expansion direction (indicated by arrow 105) to transition from the retracted configuration to the expanded configuration. In one implementation, the side frame structures 130 include linear motors to electromechanically propel the struts 110 along the expansion direction 105. For example, each side frame structure 130 includes a channel that acts as a linear guide, and motors (e.g., servo motors, stepper motors, etc.) drive coupling locations of the struts 110 along the linear guide. In another implementation, the side frame structures 130 include linear actuators to electromechanically convert rotational motion into linear motion of the struts 110 along the expansion direction 105. In another implementation, the side frame structures 130 include belt, chain, cable, and/or other conveyor drive assemblies to electromechanically convey the struts 110 in the expansion direction 105. In another implementation, the side frame structures 130 include rack and pinion, cam follower, and/or gear rack assemblies to electromechanically drive the struts 110 linearly in the expansion direction 105. In another implementation, the side frame structures 130 include pneumatic and/or hydraulic actuator assemblies to push the struts 110 along the expansion direction 105. In another implementation, the side frame structures 130 include contactless electromagnetic drive assemblies, such as based on magnetic levitation, to propel the struts 110 along the expansion direction 105.

Embodiments further include a mounting assembly 150. The mounting assembly 150 includes any suitable structure and components to physically and electrically couple the expander carriage (e.g., the side frame structures 130) with a communication satellite body structure (not shown). For example, the mounting assembly 150 is used to mount the rest of the phased-array antenna assembly 100 to the Earth deck of the satellite body. By convention, each side frame structure 130 can be considered as having a proximal end and a distal end, and the mounting assembly 150 is coupled with the expander carriage at or near the proximal ends of the side frame structures 130. For example, FIGS. 1A and 1B show the antenna assembly 100 oriented so that, when fully deployed (i.e., at least after the expander carriage is fully in the expanded configuration), the left side of the antenna assembly 100 is proximate to the communication satellite, and the left ends of the side frame structures 130 are the proximal ends.

Some embodiments of the expander carriage include additional structure. As illustrated, the expander carriage can further include an end frame structure 140. By the previously noted convention, embodiments of the end frame structure 140 are coupled between the distal ends of the side frame structures 130, such as to form three sides of a rectangular frame around the struts 110. In some implementations, the end frame structure 140 is a distal end frame structure, and the mounting assembly 150 includes a proximal end frame structure, forming a four-sided rectangular frame around the struts 110. Some embodiments of the expander carriage are configured to transition only from the retracted configuration to the expanded configuration. Other embodiments of the expander carriage are configured to transition from the retracted configuration to the expanded configuration and from the expanded configuration to the retracted configuration.

In some embodiments, the antenna assembly 100 includes, or is coupled with, a panel controller (PC) 160. The PC 160 can include a processor to control features of the antenna assembly 100, at least including controlling transitioning of the expander carriage from the retracted configuration to the expanded configuration. For example, the PC 160 can provide command signals and/or power signals to direct and/or drive the transition to the expanded configuration. Embodiments of the PC 160 can include may include any suitable one or more processors, such as a central processing unit (CPU), an application-specific integrated circuit (ASIC), an application-specific instruction-set processor (ASIP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. Some embodiments of the PC 160 further include power electronics, such as for driving electromechanical components of the expander carriage. In some embodiments, the PC 160 is a dedicated component of the antenna assembly 100. In other embodiments, the PC 160 is integrated with other processing and/or power components of the satellite. For example, the PC 160 can be physically integrated with structures of the antenna assembly 100 (e.g., in the mounting assembly 150), installed within the satellite body, or mounted on the satellite body.

Figure 2A:
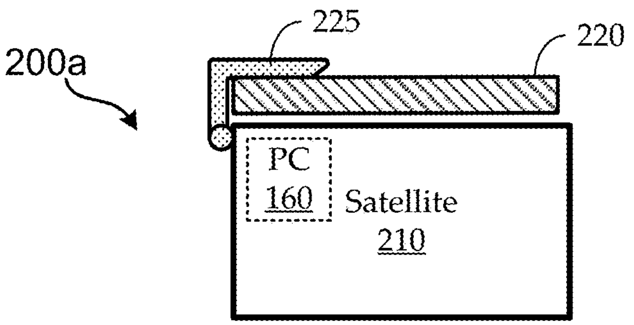
FIGS. 2A-2C show an illustrative satellite assembly having an expandable phased-array antenna panel mounted onto a communication satellite body via a mounting assembly.
Figure 2B:
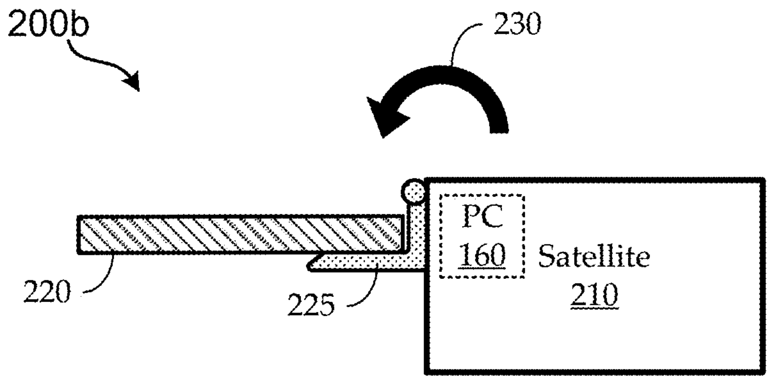
Figure 2C:
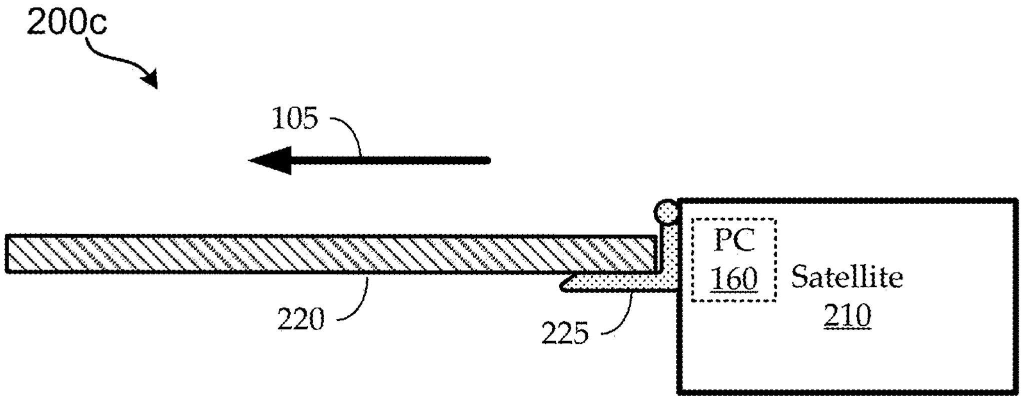

The antenna assembly 100 of FIGS. 1A and 1B can be considered as representing an antenna panel. FIGS. 2A-2C show an illustrative satellite assembly 200 having an expandable phased-array antenna panel 220 mounted onto a communication satellite body 210 via a mounting assembly 225. Embodiments of the phased-array antenna panel 220 can be an implementation of the antenna assembly 100 of FIGS. 1A and 1, and embodiments of the mounting assembly 225 can be an implementation of the mounting assembly 150 of FIGS. 1A and 1B. Components are illustrated in a highly simplified manner and are not intended to represent any particular dimensions, relative sizes, etc. The PC 160 is illustrated as integrated within the satellite body 210, but the PC 160 can be implemented in any suitable manner.

In the configuration of FIGS. 2A-2C, the mounting assembly 225 physically couples the expander carriage of the phased-array antenna panel 220 with the structure of the satellite body 210 via a hinge assembly configured electromechanically to transition between a stored configuration and a deployed configuration. FIG. 2A shows the satellite assembly 200 in the stored (e.g., pre-deployed, launch) configuration. In the stored configuration, the hinge assembly is positioned so that the phased-array antenna panel 220 is folded toward the satellite body 210 and the phased-array antenna panel 220 is in the retracted configuration. FIG. 2B shows the satellite assembly 200 in an intermediate configuration, such as after the satellite assembly 200 has been released into space by the launch vehicle, but before the phased array antenna has been fully deployed. In the intermediate configuration, the hinge assembly has rotated (as indicated by arrow 230) so that the phased-array antenna panel 220 is folded away from the satellite body 210 (the phased-array antenna panel 220 remains in the retracted configuration). FIG. 2C shows the satellite assembly 200 in a deployed configuration. In the deployed configuration, the phased-array antenna panel 220 is transitioned in the expansion direction 105 to the expanded configuration.

In some embodiments, such as suggested by FIGS. 2A-2C, the phased-array antenna panel 220 is first folded away from the satellite body 210 by the mounting assembly 225 (hinge assembly) and is subsequently transitioned to the expanded configuration. In other embodiments, the folding and expanding of the phased-array antenna panel 220 can happen concurrently (e.g., in parallel), so that the phased-array antenna panel 220 partially or completely transitions to the expanded configuration while being folded away from the satellite body 210. In some embodiments, the hinge assembly mechanism and the expander carriage mechanism are electromechanically linked, so that the rotational motion of the phased-array antenna panel 220 away from the satellite body 210 drives (or contributes to driving) the transition of the expander carriage from the retracted configuration to the expanded configuration.

In one example, an antenna panel 220 has a length of 3 meters and a width of 3 meters, thereby having an antenna area of 9 square meters ($m^2$). A conventional 9 $m^2$ phased-array antenna may support an array of approximately 1,400 REs 120, assuming a real-estate efficiency of approximately 90 percent. This corresponds to a transmit gain of approximately 34.2 dB. In the case of the satellite configuration 200 of FIGS. 2A-2C, a retracted antenna area of 9 $m^2$ can expands to an expanded antenna area of approximately 15 $m^2$ (assuming that retraction reduces the antenna area by about forty-percent, such that the expanded width remains at 3 meters, while the expanded length increases to 5 meters). Assuming the same configuration of REs 120 and the same real-estate efficiency as in the conventional case, the 15 $m^2$ antenna area can support 2,100 REs 120, which corresponds to approximately 36.3 decibels of transmit gain. This is a transmit gain improvement of approximately of 2.1 dB over the conventional case.

Figure 3A:
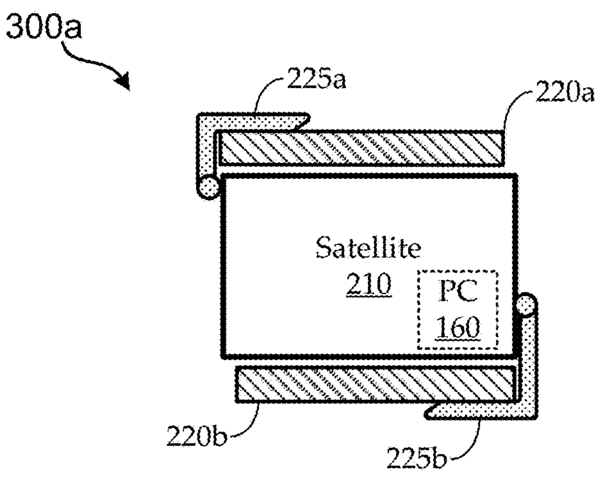
FIGS. 3A and 3B show another illustrative satellite assembly having two expandable phased-array antenna panels mounted onto opposite sides of a communication satellite body via respective mounting assemblies.
Figure 3B:
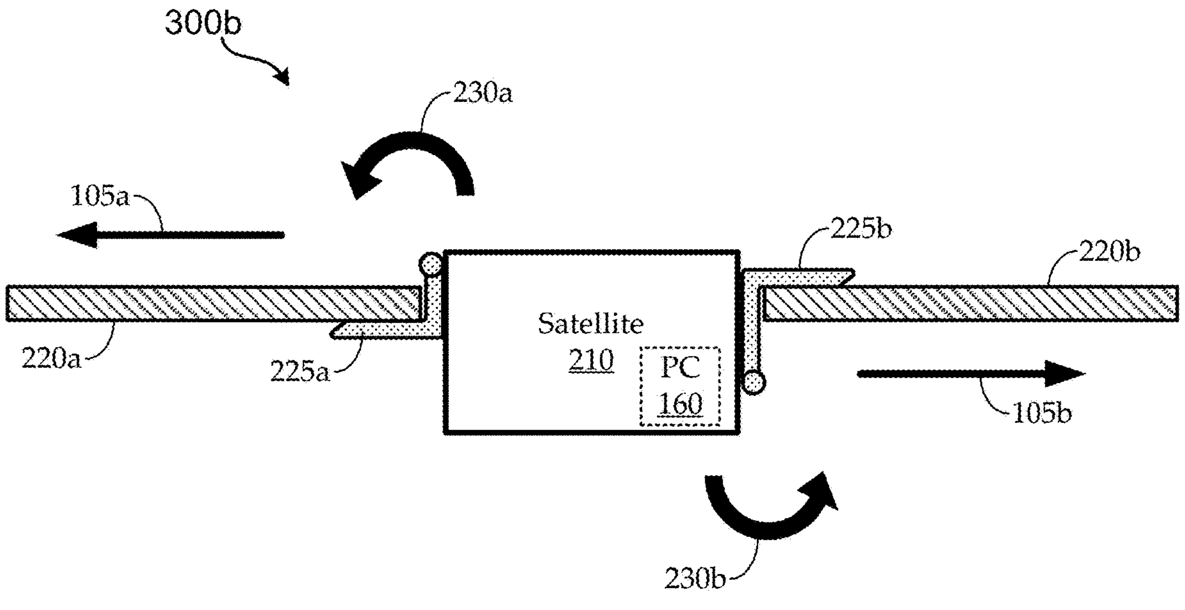

FIGS. 3A and 3B show another illustrative satellite assembly 300 having two expandable phased-array antenna panels 220 mounted onto opposite sides of a communication satellite body 210 via respective mounting assemblies 225. Embodiments of the phased-array antenna panels 220 can be implementations of the antenna assembly 100 of FIGS. 1A and 1, and embodiments of the mounting assemblies 225 can be implementations of the mounting assembly 150 of FIGS. 1A and 1B. Components are illustrated in a highly simplified manner and are not intended to represent any particular dimensions, relative sizes, etc. The PC 160 is illustrated as integrated within the satellite body 210, but the PC 160 can be implemented in any suitable manner.

In the configuration of FIGS. 3A and 3B, each mounting assembly 225 physically couples the expander carriage of a respective one of the phased-array antenna panels 220 with the structure of the satellite body 210 via a hinge assembly configured electromechanically to transition between a stored configuration and a deployed configuration. In particular, a first mounting assembly 225*a* couples a first phased-array antenna panel 220*a* to a first side of the satellite body 210 (e.g., an Earth deck), and a second mounting assembly 225*b* couples a second phased-array antenna panel 220*b* to a second (e.g., opposite) side of the satellite body 210. In some embodiments, the phased-array antenna panels 220 are both transmit-only antennas, both receive-only antennas, or are both transmit and receive antennas. In other embodiments, one of the phased-array antenna panels 220 is a transmit-only antenna, and the other of the phased-array antenna panels 220 is a receive-only antenna. For example, a transmit and receive antenna typically includes a hybrid coupler that consumes antenna gain (e.g., approximately 3 decibels of gain in some implementations). By separating the transmit and receive antennas to different phased-array antenna panels 220, the hybrid coupler can be removed, and the gain that would be consumed by the hybrid coupler can be provided to the transmit antenna for added performance.

By convention herein, descriptions of an antenna panel 220 as being coupled to a particular side of the satellite body 210 are intended generally to mean that the antenna panel 220 is coupled so that it is folded against that particular side in the stored configuration, even if some or all components used to physically couple the antenna panel 220 are mounted to a different side of the satellite body 210. For example, as illustrated, the first antenna panel 220*a* is considered coupled to the top side of the satellite body 210, even though the first mounting assembly 225*a* is shown as coupled with the upper portion of the left side of the satellite body 210.

FIG. 3A shows the satellite assembly 300*a* in the stored configuration. In the stored configuration, the hinge assemblies of both mounting assemblies 225 are positioned so that the phased-array antenna panels 220 are both folded toward the respective sides of the satellite body 210, and the phased-array antenna panels 220 are both in the retracted configuration. FIG. 3B shows the satellite assembly 300*b* in a deployed configuration. In the deployed configuration, the hinge assemblies of both mounting assemblies 225 have rotated (as indicated by arrows 230*a* and 230*b*) so that each phased-array antenna panel 220 is folded away from its respective side of the satellite body 210, and both phased-array antenna panels 220 are transitioned to the expanded configuration in the expansion direction 105. Notably, the expansion direction 105 is generally away from the satellite body 210, such that the first expansion direction 105*a* associated with the first phased-array antenna panel 220*a* is opposite the second expansion direction 105*b* associated with the second phased-array antenna panel 220*b*. As noted with reference to FIGS. 2A-2C, the rotational motion and transition to the expansion configuration can occur serially, partially in parallel, or completely in parallel.

Figure 4A:
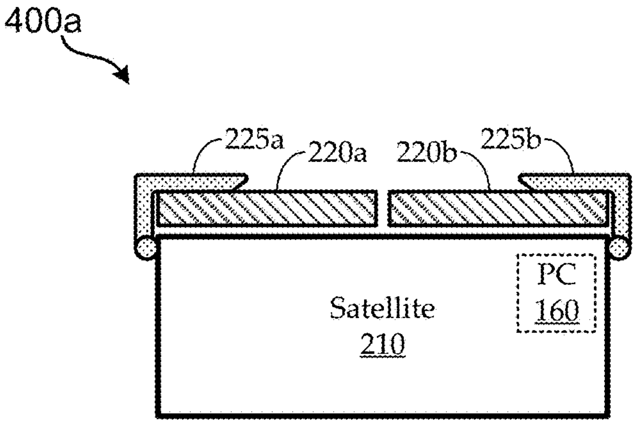
FIGS. 4A and 4B show another illustrative satellite assembly having two expandable phased-array antenna panels mounted onto a same side of a communication satellite body via respective mounting assemblies.
Figure 4B:
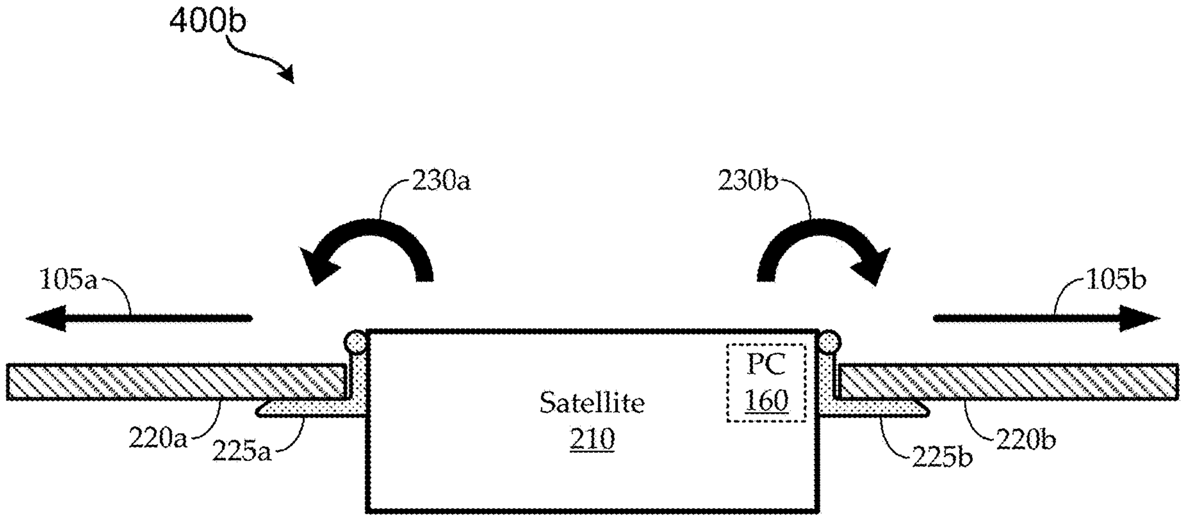

FIGS. 4A and 4B show another illustrative satellite assembly 400 having two expandable phased-array antenna panels 220 mounted onto a same side of a communication satellite body 210 via respective mounting assemblies 225. Embodiments of the phased-array antenna panels 220 can be implementations of the antenna assembly 100 of FIGS. 1A and 1, and embodiments of the mounting assemblies 225 can be implementations of the mounting assembly 150 of FIGS. 1A and 1B. Components are illustrated in a highly simplified manner and are not intended to represent any particular dimensions, relative sizes, etc. The PC 160 is illustrated as integrated within the satellite body 210, but the PC 160 can be implemented in any suitable manner.

In the configuration of FIGS. 4A and 4B, each mounting assembly 225 physically couples the expander carriage of a respective one of the phased-array antenna panels 220 with the structure of the satellite body 210 via a hinge assembly configured electromechanically to transition between a stored configuration and a deployed configuration. In particular, using the convention described with reference to FIGS. 3A and 3B, a first mounting assembly 225*a* couples a first phased-array antenna panel 220*a* to a first (e.g., top) side of the satellite body 210, and a second mounting assembly 225*b* couples a second phased-array antenna panel 220*b* to the same first side of the satellite body 210. For example, as illustrated, each phased-array antenna panel 220 can have a retracted configuration area that is approximately half of the area of the first side of the satellite body 210 to which the antenna panels 220 are mounted. As noted with reference to FIGS. 3A and 3B, the two phased-array antenna panels 220 can both be transmit-only antennas, receive-only antennas, or transmit and receive antennas; or one phased-array antenna panel 220 can be a receive-only antenna and the other phased-array antenna panel 220 can be a transmit-only phased array antenna.

FIG. 4A shows the satellite assembly 400*a* in the stored configuration. In the stored configuration, the hinge assemblies of both mounting assemblies 225 are positioned so that the phased-array antenna panels 220 are both folded toward the same side of the satellite body 210, and the phased-array antenna panels 220 are both in the retracted configuration. FIG. 4B shows the satellite assembly 400*b* in a deployed configuration. In the deployed configuration, the hinge assemblies of both mounting assemblies 225 have rotated (as indicated by arrows 230*a* and 230*b*) so that each phased-array antenna panel 220 is folded away from its respective side of the satellite body 210, and both phased-array antenna panels 220 are transitioned to the expanded configuration in the expansion direction 105. Similar to FIG. 3B, the expansion direction 105 is generally away from the satellite body 210, such that the first expansion direction 105*a* associated with the first phased-array antenna panel 220*a* is opposite the second expansion direction 105*b* associated with the second phased-array antenna panel 220*b*. As noted with reference to FIGS. 2A-2C, the rotational motion and transition to the expansion configuration can occur serially, partially in parallel, or completely in parallel.

Figure 5A:
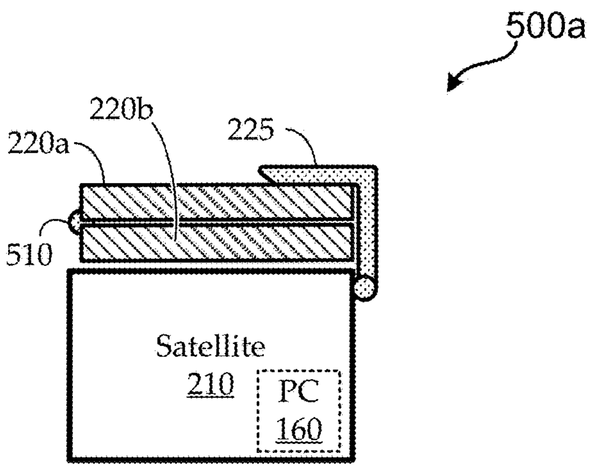
FIGS. 5A and 5B show another illustrative satellite assembly having two expandable phased-array antenna panels mounted in a bifold configuration on one side of a communication satellite body via a mounting assembly.
Figure 5B:
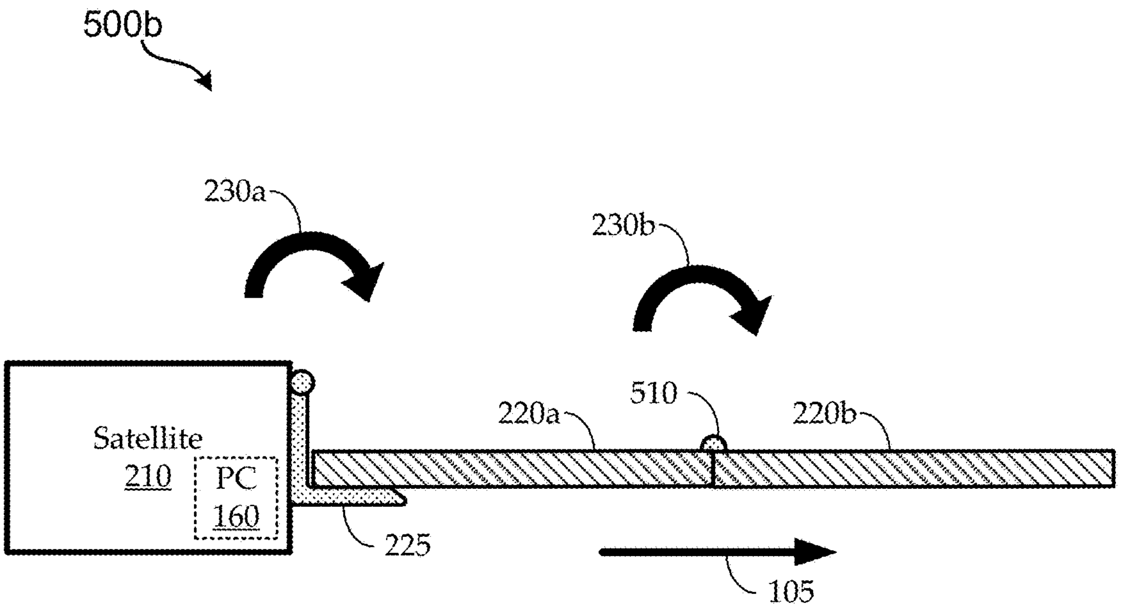

FIGS. 5A and 5B show another illustrative satellite assembly 500 having two expandable phased-array antenna panels 220 mounted in a bifold configuration on one side of a communication satellite body 210 via a mounting assembly 225. The two phased-array antenna panels 220 are coupled together via a bifold hinge assembly 510. Embodiments of the phased-array antenna panels 220 can be implementations of the antenna assembly 100 of FIGS. 1A and 1*i*, and embodiments of the mounting assembly 225 and the bifold hinge assembly 510 can be implementations of the mounting assembly 150 of FIGS. 1A and 1B. Components are illustrated in a highly simplified manner and are not intended to represent any particular dimensions, relative sizes, etc. The PC 160 is illustrated as integrated within the satellite body 210, but the PC 160 can be implemented in any suitable manner.

In the configuration of FIGS. 5A and 5B, the mounting assembly 225 physically couples the expander carriage of one of the phased-array antenna panels 220 with the structure of the satellite body 210 via a hinge assembly configured electromechanically to transition between a stored configuration and a deployed configuration, and the bifold hinge assembly 510 physically couples together the expander carriages of the two phased-array antenna panels 220 and is also configured electromechanically to transition between a stored configuration and a deployed configuration. For example, as illustrated, each phased-array antenna panel 220 can have substantially the same retracted configuration area, and that retracted configuration area can be substantially the same as that of the side of the satellite body 210 to which the antenna panels 220 are mounted.

FIG. 5A shows the satellite assembly 500*a* in the stored configuration. In the stored configuration, both the mounting assembly 225 and the bifold hinge assembly 510 are positioned so that the phased-array antenna panels 220 are folded together and toward the side of the satellite body 210, and the phased-array antenna panels 220 are both in the retracted configuration. FIG. 5B shows the satellite assembly 500*b* in a deployed configuration. In the deployed configuration, the hinge assemblies of both mounting assemblies 225 have rotated (as indicated by arrows 230*a* and 230*b*) so that the phased-array antenna panels 220 are folded away from each other and from the satellite body 210, and both phased-array antenna panels 220 are transitioned to the expanded configuration in the expansion direction 105. For example, if one antenna panel 220 has an antenna area of approximately 0.6 square meters ($m^2$) in the retracted configuration and expands to approximately 1 $m^2$ in the expanded configuration (a forty-percent antenna area reduction in the retracted configuration), the bi-folded configuration can provide approximately a seventy-percent reduction in antenna area (i.e., the bi-folded antenna panels 220 in the stored configuration is still consumes approximately 0.6 $m^2$ but deploys to a full antenna area of 2 $m^2$). As both antenna panels 220 are extending in the same direction relative to the satellite body 210, the expansion direction 105 is the same for both antenna panels 220. As noted with reference to FIGS. 2A-2C, the rotational motion and transition to the expansion configuration can occur serially, partially in parallel, or completely in parallel.

Figure 6A:
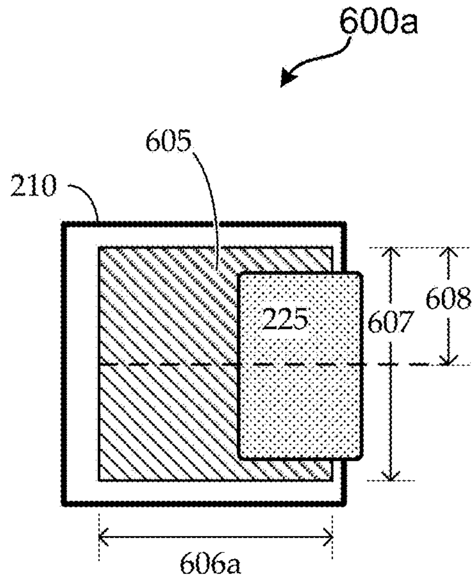
FIGS. 6A-6C show another illustrative satellite assembly having six expandable phased-array antenna panels mounted folding configuration on one side of a communication satellite body via a mounting assembly and a number of other bifold hinge assemblies.
Figure 6B:
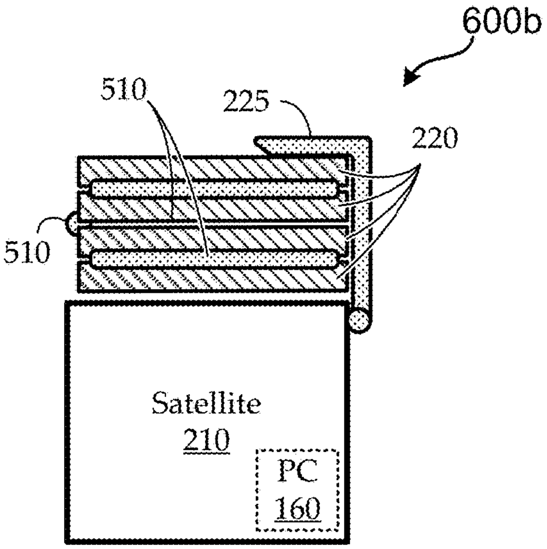
Figure 6C:
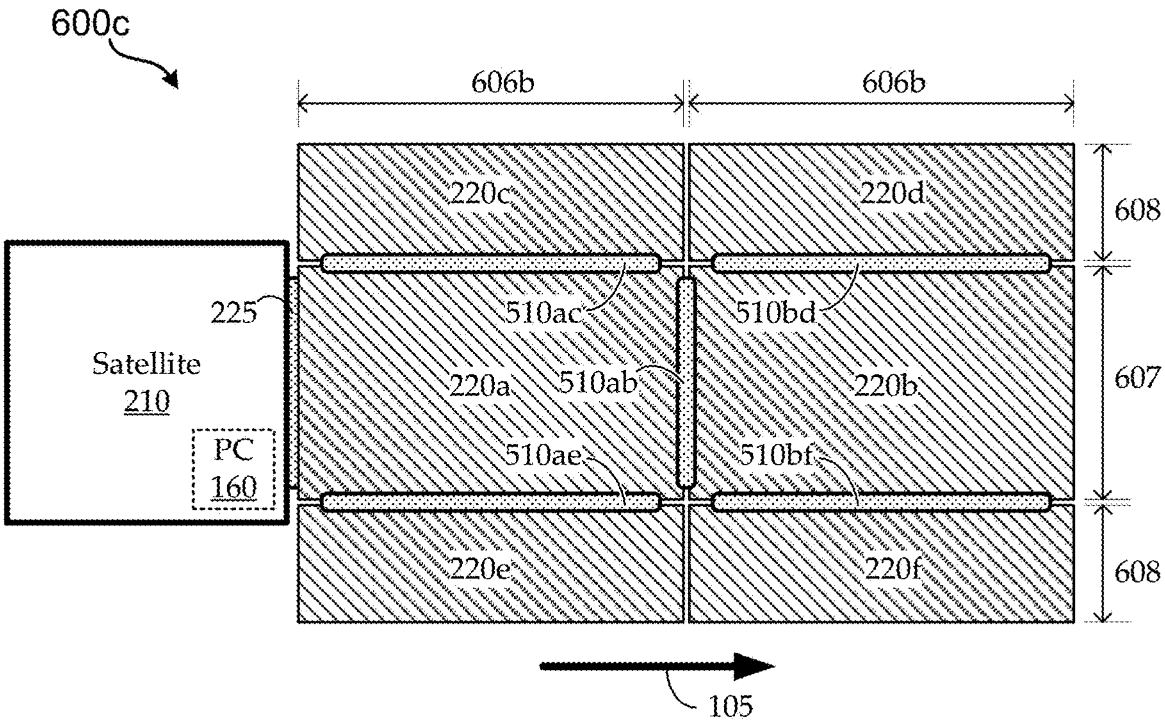

FIGS. 6A-6C show another illustrative satellite assembly 600 having six expandable phased-array antenna panels 220 mounted folding configuration on one side of a communication satellite body 210 via a mounting assembly 225 and a number of other bifold hinge assemblies 510. As shown in FIG. 6B, the illustrated configuration includes two full-sized phased-array antenna panels 220*a* and 220*b*, and four half-sized phased-array antenna panels 220*c*, 220*d*, 220*e*, and 220*f*. Embodiments of the phased-array antenna panels 220 can be implementations of the antenna assembly 100 of FIGS. 1A and 1, and embodiments of the mounting assembly 225 and at least some of the bifold hinge assemblies 510 can be implementations of the mounting assembly 150 of FIGS. 1A and 1B. Components are illustrated in a highly simplified manner and are not intended to represent any particular dimensions, relative sizes, etc. The PC 160 is illustrated as integrated within the satellite body 210, but the PC 160 can be implemented in any suitable manner.

In the configuration of FIGS. 6A-6C, the mounting assembly 225 physically couples the expander carriage of one of the full-sized phased-array antenna panels 220*a* with the structure of the satellite body 210 via a hinge assembly configured electromechanically to transition between a stored configuration and a deployed configuration, and each bifold hinge assembly 510 physically couples together the expander carriages of the associated two phased-array antenna panels 220 and is also configured electromechanically to transition between a stored configuration and a deployed configuration. In particular, as shown in FIG. 6C, antenna panels 220*a* and 220*b* are coupled together via bifold hinge assembly 510*ab*, antenna panels 220*a* and 220*c* are coupled together via bifold hinge assembly 510*ac*, antenna panels 220*a* and 220*e* are coupled together via bifold hinge assembly 510*ae*, antenna panels 220*b* and 220*d* are coupled together via bifold hinge assembly 510*bd*, and antenna panels 220*b* and 220*f* are coupled together via bifold hinge assembly 510*bf*.

FIG. 6A shows a top-down view of the satellite assembly 600*a* in the stored configuration, such as looking down at the Earth deck of the satellite body 210. In the stored configuration, the mounting assembly 225 and all the bifold hinge assemblies 610 are positioned so that the phased-array antenna panels 220 are folded together and toward the side of the satellite body 210, and the phased-array antenna panels 220 are all in the retracted configuration. As illustrated, by folding together all the phased-array antenna panels 220, an overall assembly 605 of all the phased-array antenna panels 220 in the stored configuration has a length and a width corresponding to the retracted length 606*a* and full-width 607 of a single full-sized phased-array antenna panel 220*a*, 220*b*. FIG. 6A also indicates stored dimensions of the half-sized phased-array antenna panels 220*c*-220*f* as substantially the same retracted length 606*a* and a half-width 608 that is substantially half of the full-width 607. FIG. 6B shows a side view of the stored configuration 600*b*, which is a side view of the configuration of FIG. 6A, illustrating that the stored (folded) configuration is thicker than a single antenna panel 220.

FIG. 6C shows the satellite assembly 600*c* in a deployed configuration. In the deployed configuration, the hinge assemblies of the mounting assembly 225 and all five of the bifold hinge assemblies 510 have rotated so that the phased-array antenna panels 220 are folded away from each other and from the satellite body 210. Also, as illustrated, all six of the phased-array antenna panels 220 are transitioned to their expanded configurations in a same expansion direction 105. In the expanded configuration, each of the phased-array antenna panels 220 has an expanded length 606*b*, but continues to have substantially the same width (607 or 608) as it had when in its retracted configuration.

For example, suppose each full-sized phased-array antenna panel 220*a*, 220*b* has a retracted length 606*a* of approximately 1.0 meters and a full-width 607 of approximately 1.0 meters, such that each has a retracted antenna area of approximately 1.0 $m^2$; and each half-sized phased-array antenna panel 220*c*-220*f* has the same retracted length 606*a* of approximately 1.0 meters and a half-width 607 of approximately 0.5 meters, such that each has a retracted antenna area of approximately 0.5 $m^2$. After folding out the antenna panels 220 and transitioning them to the expanded configuration, each full-sized phased-array antenna panel 220*a*, 220*b* now has an expanded length 606*b* of approximately 1.7 meters and retains the full-width 607 of approximately 1.0 meters, such that each has an expanded antenna area of approximately 1.7 $m^2$; and each half-sized phased-array antenna panel 220*c*-220*f* has the same expanded length 606*b* of approximately 1.7 meters and retains the half-width 607 of approximately 0.5 meters, such that each has an expanded antenna area of approximately 0.85 $m^2$. In such an example configuration, each antenna panel 220 has approximately forty percent less antenna area in the retracted configuration than in the expanded configuration. Across the six antenna panels 220, the overall area expands from approximately 1.0 $m^2$ to approximately 6.8 $m^2$. Each antenna panel 220 includes structures (e.g., side frames, end frames, hinge assemblies, etc.) that consume some of the expanded area, so that not all of the expanded area is usable as part of the phased array.

Many other folding configurations are possible for achieving different (e.g., greater) amounts of antenna area expansion, and multiple folding configurations can be coupled with different sides of the satellite body 210 to achieve even greater amounts of antenna area expansion. For example, an instance of the bifold configuration of FIGS. 5A and 5B, or FIGS. 6A-6C, can be coupled to each side of the satellite body 210 in a manner similar to the one illustrated in FIGS. 3A and 3B. Any such configurations can be bounded by weight, dimensional, and/or other constraints of the satellite launcher, accounting for the satellite fairing and other structures.

Further, embodiments of the satellite assemblies having multiple antenna panels 220 can implement the phased-array antenna panels 220 in several ways. In some implementations, the number of struts 110, inter-strut spacing, RE 120 layout, phased-array lattice pattern, etc. is configured to be consistent across all the phased-array antenna panels 220. For example, in satellite assembly 500 or 600 (see FIGS. 5A-6C), the fully deployed configuration (i.e., folded out and expanded) can operate as one large phased-array antenna that incorporates the REs 120 from all phased-array antenna panels 220. In such implementations, each antenna panel 220, when in its expanded configuration, forms a phased-array lattice pattern that effectively extends over the multiple antenna panels 220. In other implementations, one or more of the phased-array antenna panels 220 can be configured differently, such as with different RE 120 spacing, different number of structs 110, different inter-strut spacing, different phased-array lattice patterns, etc.

Figure 7A:
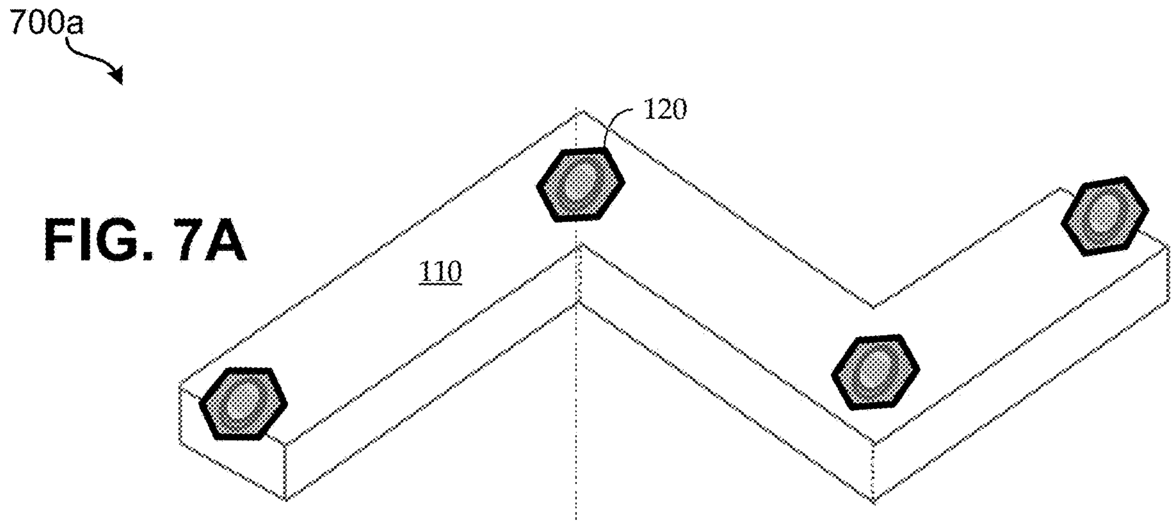
FIGS. 7A-7C shows a simplified illustration of a strut having a radiating element (RE) coupled with an element circuit.
Figure 7B:
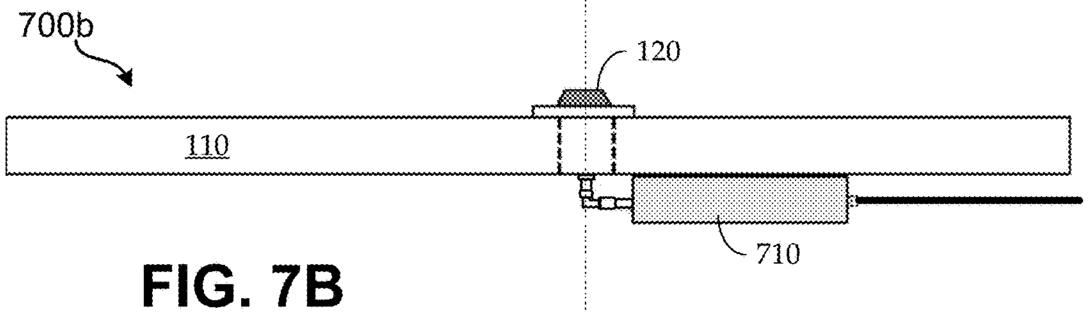
Figure 7C:
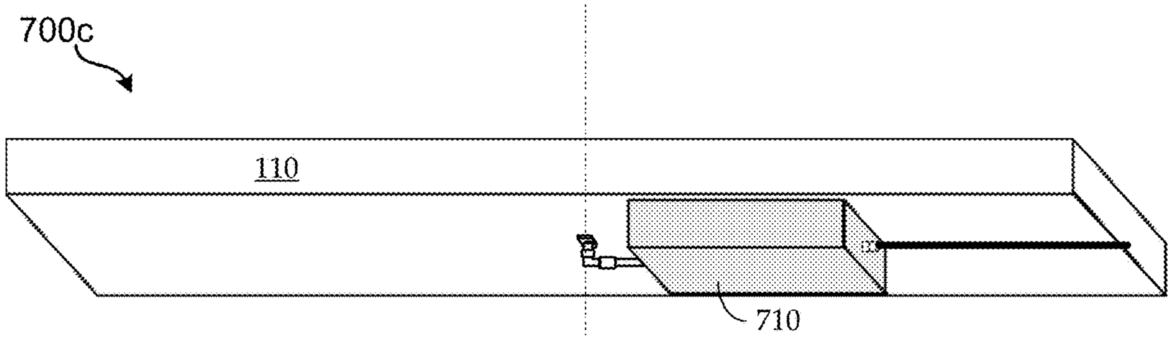

In some embodiments, communication components of the satellite communicate with the REs 110 via element circuits. FIGS. 7A-7C shows a simplified illustration of a portion of a strut 110 having a radiating element (RE) 120 coupled with an element circuit 710. FIGS. 7A-7C show top-isometric, side-orthographic, and bottom-isometric views, respectively. The side-orthographic and bottom-isometric views in FIGS. 7B and 7C do not precisely correspond to the strut shown in FIG. 7A; they are intended only to illustrate a manner of integration of an RE 120 and associated components with a strut 110. For example, multiple REs 120 are shown in FIG. 7A, while only one of those REs 120 is shown in FIGS. 7B and 7C. In some embodiments, each RE 120 is coupled with a respective (i.e., dedicated) element circuit 710. In other embodiments, one element circuit 710 is coupled with multiple REs 120. Each element circuit 710 can be physical coupled with one of the struts 110.

The element circuit 710 can include any suitable components to implement communications between communication components of the satellite and the corresponding RE 120. For example, the satellite sends a respective signal to each RE 120 with a dynamically adjusted phase and amplitude via the corresponding element circuit 710. In some embodiments, each RE 120 is a radiofrequency (RF) component, the satellite transmits RE-specific signals as optical signals via optical communication links (e.g., fiberoptic cables), and the element circuits 710 are optical-to-RF converters. The element circuits 710 can include additional elements, such as amplifiers, filters, modulators, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An expandable phased-array antenna assembly for a communication satellite, the antenna assembly comprising:
- an expander carriage configured electromechanically to transition between a retracted configuration and an expanded configuration along an expansion direction;
- a plurality of struts coupled with the expander carriage, such that the plurality of struts is spaced along the expansion direction at a first inter-strut spacing with the expander carriage in the retracted configuration, and the plurality of struts is spaced along the expansion direction at a second inter-strut spacing with the expander carriage in the expanded configuration, the second inter-strut spacing being larger than the first inter-strut spacing; and
- a plurality of radiating elements (REs) mounted on the plurality of struts in an arrangement that forms a phased-array lattice pattern with the expander carriage in the expanded configuration.

2. The antenna assembly of claim 1, wherein each of the plurality of struts is aligned in a direction orthogonal to the expansion direction and has a zigzag shape configured so that each of the plurality of struts at least partially nests into an adjacent one of the plurality of struts with the expander carriage in the retracted configuration.

3. The antenna assembly of claim 1, wherein the phased-array lattice pattern is a tiled diamond-shaped array.

4. The antenna assembly of claim 1, wherein the plurality of REs is mounted on the plurality of struts in a staggered arrangement such that the REs form a diamond-shaped phased-array lattice pattern with the expander carriage in the expanded configuration.

5. The antenna assembly of claim 1, wherein:
- the expander carriage comprises a first side frame structure configured to couple with a first end of each of the plurality of struts, and a second side frame structure configured to couple with a second end of each of the plurality of struts opposite the first end; and
- each of the first side frame structure and the second side frame structure aligned substantially with the expansion direction and configured electromechanically to transition between the retracted configuration and the expanded configuration along the expansion direction.

6. The antenna assembly of claim 5, wherein:
- each of the first side frame structure and the second side frame structure is configured electromechanically to transition between the retracted configuration and the expanded configuration by telescoping along the expansion direction.

7. The antenna assembly of claim 5, wherein:
- each of the first side frame structure and the second side frame structure has a proximal end configured to point toward the communication satellite when deployed and a distal end configured to point away from the communication satellite when deployed; and
- the expander carriage further comprises an end frame structure coupled between the distal ends of the first side frame structure and the second side frame structure to form three sides of a rectangular frame around the plurality of struts.

8. The antenna assembly of claim 5, wherein:
- the plurality of REs is a first plurality of REs;
- the plurality of struts is a first plurality of struts;
- the expander carriage comprises a first antenna panel formed by the first side frame structure, the second side frame structure, and the first plurality of struts;
- the expander carriage further comprises a second antenna panel formed by a third side frame structure, a fourth side frame structure, and a second plurality of struts;
- the first and second antenna panels are coupled together by a hinge assembly configured electromechanically to transition between a stored configuration and a deployed configuration, such that the first and second antenna panels are folded towards each other with the hinge assembly in the stored configuration and are folded away from each other with the hinge assembly in the deployed configuration;
- the first, second, third, and fourth side frame structures are all aligned substantially parallel to each other and with the expansion direction, and are all configured electromechanically to transition the first and second antenna panels between the retracted configuration and the expanded configuration along the expansion direction;
- each of the second plurality of struts is coupled between the third and fourth side frame structures; and
- a second plurality of REs are mounted on the second plurality of struts in an arrangement that forms a second phased-array lattice pattern with the second antenna panel in the expanded configuration.

9. The antenna assembly of claim 8, wherein the expander carriage comprises:

a first instance of the second antenna panel coupled with the first side frame structure of the first antenna panel via a first instance of the hinge assembly; and a second instance of the second antenna panel coupled with the second side frame structure of the first antenna panel via a second instance of the hinge assembly.

10. The antenna assembly of claim 9, wherein:

the first antenna panel has a first panel length and a first panel width; and the second antenna panel has a second panel length and a second panel width, wherein the second panel length is substantially equal to the first panel length, and the second panel with is substantially equal to half of the first panel width.

11. The antenna assembly of claim 8, wherein the expander carriage comprises:

a first and second instances of the first antenna panel coupled with each other via a second hinge assembly configured electromechanically to transition between the stored configuration and the deployed configuration, such that the first and second instances of the first antenna panel are folded towards each other with the hinge assembly in the stored configuration and are folded away from each other with the hinge assembly in the deployed configuration.

12. The antenna assembly of claim 8, wherein:

the phased-array lattice pattern is a first phased-array lattice pattern;

each of the first and second plurality of struts has a same quantity of struts; and the second plurality of struts is spaced along the expansion direction at the first inter-strut spacing with the expander carriage in the retracted configuration, and the plurality of struts is spaced along the expansion direction at the second inter-strut spacing with the expander carriage in the expanded configuration, such that second phased-array lattice pattern is an extension of the first phased-array lattice pattern.

13. The antenna assembly of claim 5, wherein:

each of the first side frame structure and the second side frame structure has respective first and second substructures coupled together by a hinge assembly configured electromechanically to transition between a stored configuration and a deployed configuration, such that, for each side frame structure, the respective first and second substructures are folded towards each other with the hinge assembly in the stored configuration and are folded away from each other with the hinge assembly in the deployed configuration.

14. The antenna assembly of claim 1, further comprising:

a mounting assembly to physically and electrically couple the expander carriage with a communication satellite body structure.

15. The antenna assembly of claim 14, wherein:

the mounting assembly is to physically couple the expander carriage with the communication satellite body structure via a hinge assembly configured electromechanically to transition between a stored configuration and a deployed configuration, such that the expander carriage is folded toward the communication satellite body structure with the hinge assembly in the stored configuration, and the expander carriage is folded away from the communication satellite body structure with the hinge assembly in the deployed configuration.

16. The antenna assembly of claim 14, further comprising:

a plurality of element circuits, each physically coupled with one of the plurality of struts and electrically coupled with an associated one of the plurality of REs; and the mounting assembly is further to communicatively couple the plurality of element circuits with a satellite communication system disposed in the communication satellite body structure.

17. The antenna assembly of claim 16, wherein:

the mounting assembly is to communicatively couple each of the plurality of element circuits with the satellite communication system via an optical communication path; and each of the plurality of element circuits comprises an optical-to-radiofrequency converter.

18. The antenna assembly of claim 1, wherein the communication satellite is an S-band low Earth orbit (LEO) satellite.

19. A communication satellite comprising:

a satellite body structure having a top, a bottom opposite the top, a first side, and a second side opposite the first side;

a first instance of the antenna assembly of claim 1 coupled with the satellite body structure via a first hinge assembly, the first hinge assembly configured electromechanically to transition between a stored configuration and a deployed configuration, such that the first instance of the antenna assembly is folded toward the top or the bottom of the satellite body structure with the first hinge assembly in the stored configuration, and the expander carriage is folded away from the satellite body structure toward the first side of the satellite body structure with the first hinge assembly in the deployed configuration; and a second instance of the antenna assembly of claim 1 coupled with the satellite body structure via a second hinge assembly, the second hinge assembly configured electromechanically to transition between the stored configuration and the deployed configuration, such that the second instance of the antenna assembly is folded toward the top or the bottom of the satellite body structure with the second hinge assembly in the stored configuration, and the expander carriage is folded away from the satellite body structure toward the second side of the satellite body structure with the second hinge assembly in the deployed configuration.

20. The communication satellite of claim 19, wherein:

the first instance of the antenna assembly is folded toward the top of the satellite body structure with the first hinge assembly in the stored configuration; and the second instance of the antenna assembly is folded toward the bottom of the satellite body structure with the hinge assembly in the stored configuration.

* * * * *